United States Patent [19]
Cutolo et al.

[11] Patent Number: 5,747,137
[45] Date of Patent: May 5, 1998

[54] FLEXIBLE, COMPOSITE THERMOPLASTIC FILAMENT WHICH CONTAINS ENDLESS FIBRES AND PROCESS FOR PREPARING IT

[75] Inventors: Domingo Cutolo, Gessate; Erminio Zoppi, Codogno, both of Italy

[73] Assignees: Eniricerche S.p.A.; Enichem S.p.A., both of Milan, Italy

[21] Appl. No.: 554,103

[22] Filed: Nov. 6, 1995

Related U.S. Application Data

[63] Continuation of Ser. No. 242,600, May 13, 1994, abandoned.

[30] Foreign Application Priority Data

May 18, 1993 [IT] Italy .................................. MI93A1010

[51] Int. Cl.$^6$ ........................................................ B32B 1/04
[52] U.S. Cl. ...................... 428/74; 428/368; 428/372; 428/373; 428/374; 428/375; 428/376; 428/378; 428/392; 428/394; 428/395; 428/396; 428/399; 428/401; 264/177.13; 264/177.16
[58] Field of Search ........................... 428/375, 378, 428/392, 373, 374, 74, 368, 376, 394, 395, 396, 399, 401, 372; 264/177.13, 177.16

[56] References Cited

U.S. PATENT DOCUMENTS

| | | |
|---|---|---|
| 3,742,106 | 6/1973 | Price . |
| 4,614,678 | 9/1986 | Ganga . |
| 4,770,915 | 9/1988 | Nakagawa et al. ............ 428/373 |
| 5,137,781 | 8/1992 | Lahijani et al. . |
| 5,206,085 | 4/1993 | Nakagawa et al. ............ 428/372 |

OTHER PUBLICATIONS

Patent Abstracts of Japan, vol. 11, No. 60 (C-405), Feb. 24, 1987, JP-A-61 219 731, Sep. 30, 1986.

*Primary Examiner*—Patrick Ryan
*Assistant Examiner*—J. M. Gray
*Attorney, Agent, or Firm*—Oblon, Spivak, McClelland, Maier & Neustadt, P.C.

[57] ABSTRACT

A flexible, composite, thermoplastic filament, which contains continuous fibers, and which filament contains a flexible sheath of a thermoplastic polymer which coats a fiber bundle of fibers, which fiber bundle is impregnated with a thermoplastic powder, which is made of the same thermoplastic polymer coating the fiber bundle, wherein the filament has a substantially elliptical cross-section.

13 Claims, 2 Drawing Sheets

FLEXIBLE, COMPOSITE THERMOPLASTIC FILAMENT WHICH CONTAINS ENDLESS FIBRES AND PROCESS FOR PREPARING IT

This application is a Continuation of application Ser. No. 08/242,600, filed on May 13, 1994, now abandoned.

BACKGROUND OF THE INVENTION

1. Field of the Invention

The present invention relates to a flexible, composite, thermoplastic filament which contains endless (i.e., continuous) fibres and to the process for preparing it.

More particularly, the present invention relates to a flexible, composite, thermoplastic filament constituted by fibre bundles of endless fibres of any kinds, whether mineral, or organic or metal fibres, impregnated with a thermoplastic powder and coated with an external flexible, thermoplastic sheath, which may either be of the same type, or of a different type, as of the thermoplastic component of the powder.

2. Description of the Background

In a large number of applications, heretofore dominated by the use of metal materials, composite materials were proposed which are constituted by a polymeric matrix and an inorganic reinforcer component, above all fibreglass or carbon fibres. Under conditions under which particularly high performance are required as regards the mechanical strength, long-fibre or, above all, endless-fibre composites are proposed.

The first type of long-fibre or endless-fibre composite, developed as an alternative to the metal materials, was characterized by having a matrix constituted by thermosetting polymers, typical example of which are epoxy resins, unsaturated polyester resins and bismaleimides. Fabrication technologies for processing these type of materials were, and still are, preimpregnation and pultrusion.

Both technologies require that the fibres flow through suitable solutions of the thermosetting material, with consequent environmental problems and high process cost, due to the need for managing the re-use and/or the storage of the used solvents.

In order to obviate such drawbacks, more recently composite materials were introduced which use thermoplastic polymers as their matrix. In this case, the relevant fabrication technology implies, when the composite is a long- or endless-fibre one, the preliminary fabrication of a semifinished intermediate.

An example of preparation of such a type of semifinished intermediate is reported in U.S. Pat. No. 3,742,106; in which the formation of a composite by impregnation of a continuous reinforcer filament in a thermoplastic molten mass is disclosed.

A further example of semifinished intermediate for composite with thermoplastic matrix is reported in Journal of Applied Polymer Science—Applied Polymer Symposium, vol. 47, p. 501, 1991, in which the preparation is described of an endless filament by spinning a mix constituted by reinforcer fibres and thermoplastic fibres.

U.S. Pat. No. 4,614,678 discloses the formation of a composite article by impregnating a fibre bundle with thermoplastic powders and coating said fibre bundle with a thermoplastic sheath.

More particularly, according to the process disclosed herein:

- an endless filament constituted by a fibre bundle, is unwound from a bobbin;
- the filament is fed to a closed chamber inside which a thermoplastic polymer powder is kept under a fluidized condition by means of a fluidizing gas;
- inside said chamber, the filament bundle is loosened in order to separate it essentially into its individual fibres;
- the loosened filament is caused to run through the fluidized polymer during a long enough time in order that polymer particles can be deposited around the individual fibres;
- the filament is recompacted and around it a flexible sheltering sheath of thermoplastic polymer, preferably of the same kind as of the polymer powder, is applied.

After obtaining semifinished intermediates, fabricated pieces are produced by means of consolidating techniques which may require heating and pressure application, as reported, e.g., under various entries in Encyclopedia of Composites, S. M. Lee editor, published by VCH Publishers, New York, 1990–1991, or pultrusion of said semifinished articles.

The use of thermoplastic composites undoubtedly allows improvements to be achieved from the environmental view point because no solvents are required by the manufacturing cycles. Unfortunately, however, some problems arise from the view point of transformation into finished articles, above all when the composite material is constituted by a continuous, multifibre filament impregnated with a thermoplastic polymer powder. In this case, in fact, it was observed that manufacturing the semifinished intermediate requires extraordinarily long moulding times caused, as it will be demonstrated hereinafter, by the particular structure of the material, which appears as a flexible cord having an essentially circular cross section.

The purpose of the present invention is to provide a flexible, composite material which contains endless fibres impregnated with a thermoplastic powder, which requires very much reduced moulding times as compared to those required by the equivalent materials known from the prior art.

DETAILED DESCRIPTION OF THE PREFERRED EMBODIMENTS

Figure 1:
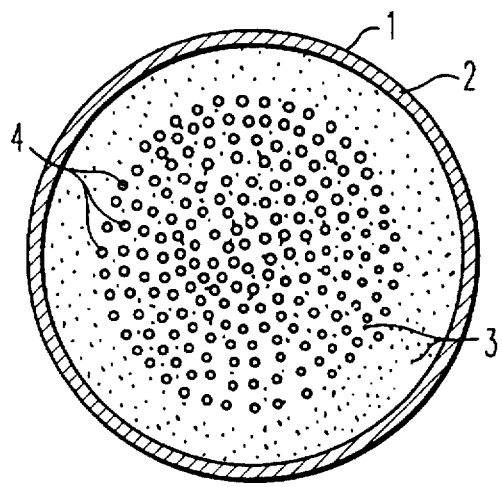
FIG. 1 illustrates a cross-section of a composite filament obtained by a conventional method.

The present Applicant found now that the above stated purpose can be achieved if one uses, as the semifinished intermediate, a composite based on endless fibres impregnated with a thermoplastic powder and coated with a flexible sheath, having the form of a flexible cord, with an essentially elliptical cross section.

Therefore, the object of the present invention is a flexible, composite, thermoplastic filament, which contains endless fibres and is essentially constituted by a flexible sheath of a thermoplastic polymer which coats a bundle of fibres impregnated with a thermoplastic powder, characterized in that said filament has an essentially elliptical cross section with $d_1/d_2$ lower than 1, preferably comprised within the range of from 0.1 to 0.5, wherein $d_1$ represents the minor diameter and $d_2$ represents the major diameter of said essentially elliptical section.

The composite filament according to the present invention displays a high flexibility which makes it possible to be woven in order to produce highly flexible mats, or to be used as such in order to produce articles having any shape or size, by means of the so said "filament winding" technique. The filament may have a fibre content of up to 70% by volume, and preferably comprised within the range of from 40 to 60%.

Any types of fibre can be used in order to prepare the composite according to the present invention.

Typical examples are fibreglass with a count comprised within the range of from 150 to 2500 tex, the aramidic fibres of Kevlar® type, having a count comprise within the range of from 1000 to 2000 decitex, or carbon fibres with a count of from $3 \times 10^3$ to $12 \times 10^3$ filaments.

The particle size of the powder which impregnates the fibres is not critical for the realization of the composite filament according to the present invention. The only critical parameter may possibly be the thickness or diameter of the individual fibres which constitute the fibre bundle.

In fact, on considering that the impregnation of the fibre bundle with the powder is yielded by the particles gathering around each fibre, it is preferable that said particles have an average size which is approximately the same as of, or smaller than, the thickness of each individual fibre. In general, the average diameter of the individual particles is comprised within the range of from 10 to 100 micrometres.

Alternatively to the powder, also thermoplastic endless fibres interlaced with the reinforcer fibres can be used.

Every thermoplastic polymer can be used in order to prepare the thermoplastic powder which impregnates the composite filament according to the present invention, and illustrative examples comprise: polyolefins, such as low-, medium- or high-density polyethylene, polypropylene, polystyrene, ethylene copolymers with propylene and/or butenes, halogenated polyolefins such as polyvinyl chloride, polyvinylidene chloride, polyvinyl fluoride, polyvinylidene fluoride, styrene copolymers (ABS, SAN, etc), aliphatic (co)polyesters such as polyethylene terephthalate, polybutylene terephthalate, polyethylene naphthalene dicarboxilate and their copolymers; aromatic polyesters; polyacrylates and/or polymethacrylates and their copolymers; thermotropic liquid-crystal polymers; Pa-6, Pa-6,6, Pa-4,6, Pa-11 and Pa-12 polyamides; polycarbonates, e.g., bisphenol-A polycarbonates; polyether-imides; polyketones; polysulfones; and so forth; and their mixtures.

The flexible sheath which coats the fibre bundle is present in such a way as to have a weight ratio of the impregnating powder to the same sheath comprised within the range of from 1:2 to 2:1.

The material the sheath consists of is selected from the previously listed thermoplastic polymers, and can be of either the same type as, or different from, the thermoplastic powder component. Sheaths made from polymers not only different from, but also having higher or lower melting temperatures than of the polymers which constitute the powder, can be used as well.

The outer sheath is applied to the impregnated fibre bundle by means of well known extrusion techniques, disclosed in European patent applications published under Publ. Nos. 188,939 and 190,522.

According to these techniques, the powder impregnated fibre bundle is caused to coaxially run through a tubular die connected with an extruder. The plastic material, extruded through the tubular die, is dragged by viscous effect by the bundle during its passage through the die and, after a few seconds, cools down, forming said sheath.

In order that the cross section of the composite filament may be given an essentially elliptical shape, the tubular die has its cross-section having a geometrical rhombus shape with mean values of its diagonals approximately equal to $d_1$ and $d_2$.

Figure 2:
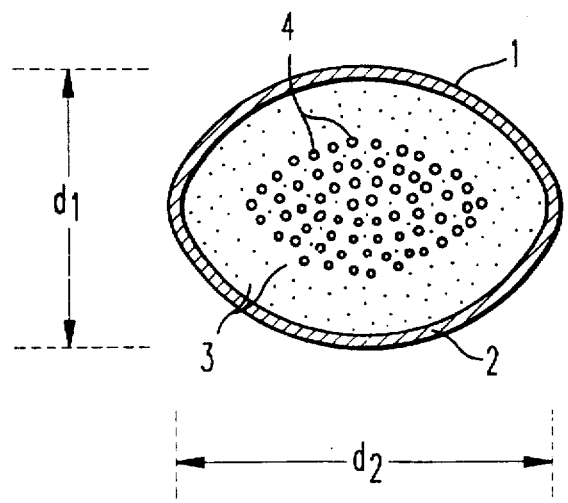
FIG. 2 illustrates a cross-section of a compositie filament provided by the present invention.

In FIGS. 1 and 2, the cross sections are schematically displayed of the composite filaments obtained by means of the methods known from the prior art and according to the present invention, respectively.

The composite (1) comprises a sheath (2) which coats the fibres (4) impregnated with the powder (3).

Figure 3:
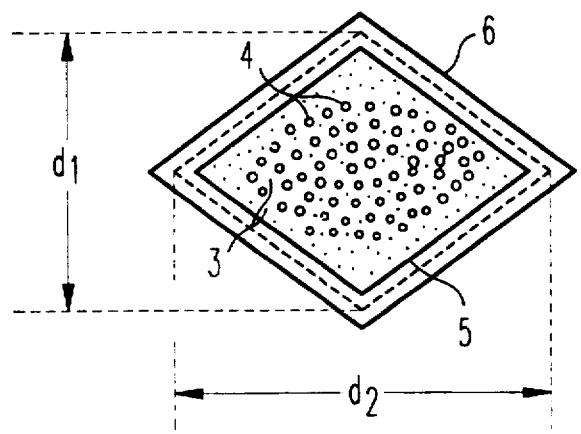
FIG. 3 illustrates a rhomboidal-shaped cross section of a tubular die in accordance with the present invention.

In FIG. 3, the rhomboidal-shaped cross section of the tubular die is displayed wherein, by short-dashed line, the perimeter formed by the mean diagonals is represented. The die comprises the die nose (5) and the external jacket (6).

An alternative method in order to produce the composite filament with a cross section of essentially elliptical shape, provides for the powder-impregnated fibre bundle to be flattened by a pair of rollers and the sheaths to be extruded through a tubular die with a circular cross section of larger diameter than of the maximal thickness of the flattened fibre bundle.

The composite material according to the present invention displays a high flexibility which makes it possible it to be woven in order to form highly flexible mats, or to be used in its pristine state in order to fabricate articles of any shape or size, according to the "filament winding" technique.

More particularly, the composite material according to the present invention is suitable for being used instead of metal and their alloys in building, transportation, aerospace sectors, and so on.

A process for producing the composite, continuous-fibre-containing filament according to the present invention comprises:

(a) unwinding a continuous (endless) fibre bundle from a bobbin;

(b) loosening the fibre bundle, in order to separate it essentially into its individual fibres;

(c) impregnating the individual fibres with a thermoplastic polymer powder;

(d) recompacting the fibre bundle and providing a flexible sheltering sheath around it, also made from a thermoplastic polymer, by causing the fibre bundle to coaxially run through a tubular die having its cross section of rhomboidal shape with mean diagonals equal to $d_1$ and $d_2$.

The loosening of the fibre bundle can be carried out by means of a mechanical system with small-diameter rollers of vibrating type, pneumatic type, and the like. When the fibre bundle is loosened, the latter is ready for its component fibres to be impregnated with the thermoplastic powder.

Any systems capable of impregnating endless fibres with a powder can be used in the process according to the present invention.

An operable impregnation system can be that fluidized-bed system which is disclosed in U.S. Pat. No. 4,614,678; according to which the by now loosened fibre bundle is caused to run through the powder kept under fluidized conditions.

The fluidized bed is constituted by a sealed chamber inside which the polymer powder is kept fluidized (i.e., suspended) by circulating air or nitrogen.

As reported hereinabove, the size of powder particles is not critical, but said powder particles should preferably have an average size which is approximately the same as, or lower than, the diameter of each individual fibre. In general, the average diameter of the individual particles is comprised within the range of from 10 to 100 micrometres.

In order to favour the impregnation, the loosened filament is driven inside the interior of the fluidized bed by means of metal pulleys, preferably of aluminum and asimmetrically arranged inside the sealed chamber, with at least one of them being electrically connected with earth. In general, the number of pulleys is comprised within the range of from 2 to 6.

According to another impregnation system, the loosened fibre bundle is dipped and caused to run through a stationary bed constituted by the thermoplastic polymer powder, contained in a tank submitted to continuous vibration.

By "stationary bed", as this term is used in the instant disclosure and in the appended claims, a powder bed or layer is meant in which the individual particles can freely move along the horizontal plane, with any vertical motions of the particles being exclusively limited to the thickness of the layer.

The vibrations of the polymer powder containing tank can be obtained by mechanical means, by swinging arms, or by means of an electromagnetic head. The intensity of the vibrations is not very high, but should be such as prevent preferential channels from being formed in the powder during the passage of the fibre bundle.

Figure 4:
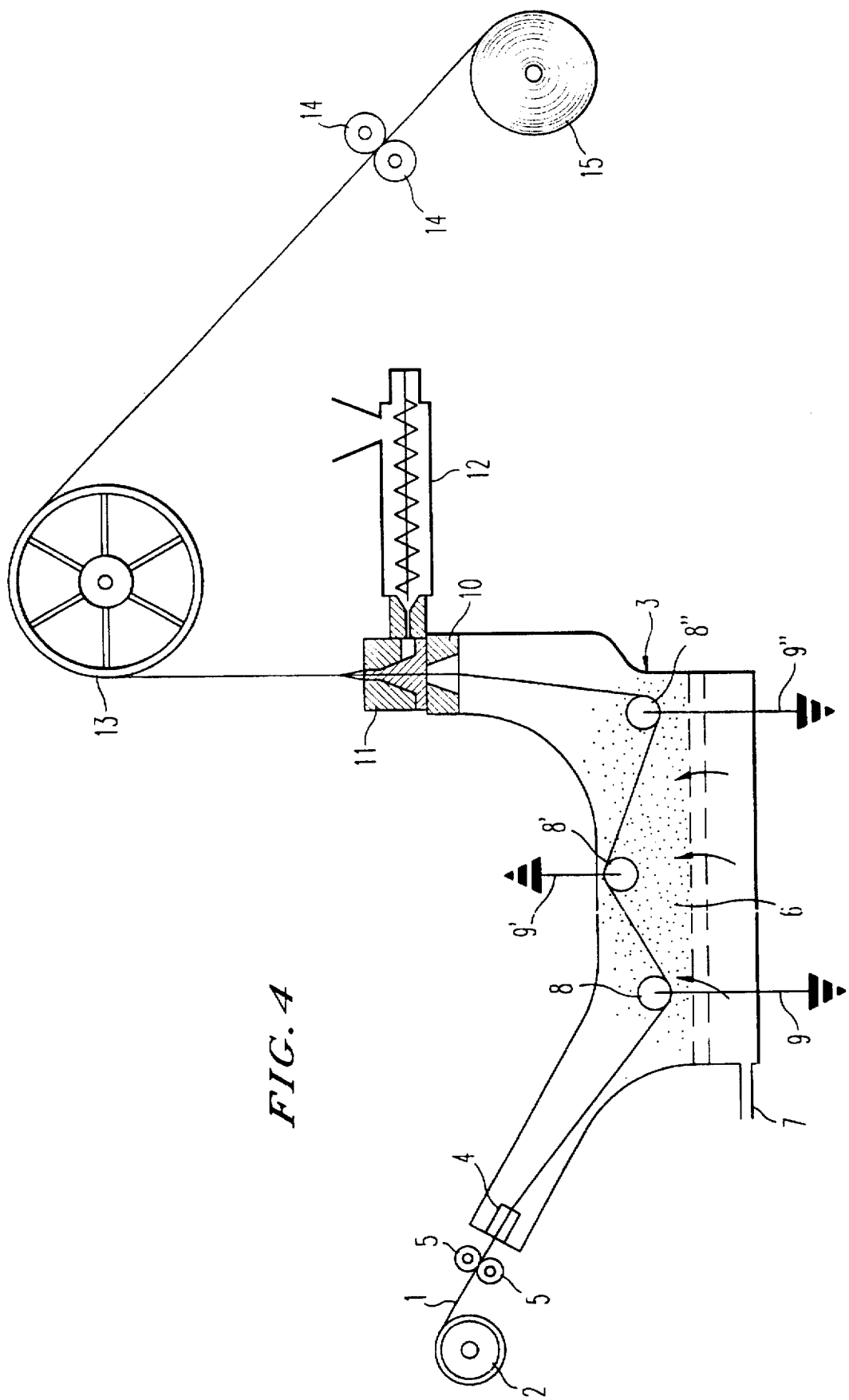
FIG. 4 illustrates an apparatus by which the flexible composite materials of the present invention may be provided.

The process for preparing flexible composite materials according to the present invention can be better illustrated by referring to the drawing of the accompanying FIG. 4, which represents a non-limitative example of operating scheme thereof.

An endless fibre bundle (1) is unwound from a bobbin (2) and is fed to a tightly sealed chamber (3) through the sealed opening (4).

Before entering the chamber, the fibre bundle is loosened, and essentially separated into its individual fibres, by means of two or more rollers (5).

Inside the chamber (3), a thermoplastic polymer powder (6) is kept under fluidized conditions by an air or nitrogen stream fed through the duct (7).

The loosened fibre bundle is pulled to run through the fluidized bed through which it is driven by the pulleys (8), (8') and (8") and, during this passage, the fibres are coated by the powder.

The powder impregnated fibre bundle leaves the chamber (3) and is recompacted through the sealed opening (10) above which a tubular die (11), fed by an extruder (12), suitable for coating the powder-impregnated fibre bundle with a flexible sheath of thermoplastic polymer. The die (11) is illustrated in greater detail in FIG. 3.

The so prepared composite filament is caused to run around the pulley (13), in order to favour its air-cooling, then, driven by rollers (14), is collected on bobbin (15).

In order to better understand the present invention and to practice it, some illustrative, non-limitative examples thereof are reported in the following.

Example 1

A fibre bundle of carbon fibres of 6000 filaments (6K), manufactured by SOFICAR, with a count of 400 g/km is impregnated with a powder constituted by polyether-etherketone (PEEK) 150 P ex Imperial Chemical Industries (ICI). Said PEEK was preliminarily ground in order to obtain a powder with particles size of approximately 45 micrometres.

The impregnation is carried out by causing the fibre bundle to run, at a speed of 45 meters/minute, through a mechanical loosener constituted by 4 rollers of 20 mm of diameter and causing the by now loosened fibre bundle to subsequently run through a fluidized bed obtained by injecting 1600 liters/hour of nitrogen through 900 g of powder contained inside a sealed chamber.

Inside the interior of said sealed chamber, the loosened fibre bundle is guided through three pulleys asimmetrically arranged in such a way as to always have a filament length of about 0.5 meters dipped inside the fluidized bed.

At the end of the impregnation, the sheath constituted by the same polymer as the polymer powder, is applied to the fibre bundle.

The sheath is applied to the filament by means of an extruder of Maillefer 30 type equipped with a tubular die the cross section of which has a rhomboidal geometrical shape the mean diagonals of which are in the ratio of $d_1/d_2=0.127$, and with a surface area of 0.4 mm$^2$.

The so prepared composite filament displays a transversal cross section of elliptical shape with major and minor diameters of 1 mm and 0.127 mm respectively.

With the so prepared composite filament, specimens were prepared in order to determine the moulding times.

The filament was manually wound around a rectangular sheet, caring of filling the available room as evenly as possible.

The sheet was submitted to partial welding in order to favour the handiness thereof, and then was cut in perpendicular direction to the filament, in order to have sample units of 20×20 cm of size, available. Then, the sheets were moulded at PEEK melting temperature. The required time for completely consolidating the sample is of the order of 16 minutes.

Example 2

This test was run by following the previously specified modalities, using a fibre bundle of SOFICAR carbon fibres of 3000 filaments (3K). The resulting composite filament had a cross section with elliptical shape, with diameters of 0.5 and 0.134 mm, respectively, and a surface area of 0.2 mm$^2$. The moulding time was of about 18 minutes.

Using the same materials, but operating according to the principles disclosed in U.S. Pat. No. 4,614,678, a composite filament with circular cross section of 0.2 mm$^2$ of surface area was prepared. From this material, an analagous specimen to those as of Examples 1 or 2 was prepared. The moulding time was of about 30 minutes.

We claim:

1. A flexible, composite, thermoplastic filament, which contains continuous fibers selected from the group consisting of carbon, fiberglass and aramid fibers, and which filament consists essentially of a flexible sheath of a thermoplastic polymer which coats a fiber bundle of fibers, which fiber bundle is impregnated with a thermoplastic powder, which is made of the same thermoplastic polymer coating said fiber bundle, said filament being obtained through a process consisting essentially of:

a) unwinding a continuous fiber bundle from a bobbin, b) loosening the fiber bundle, in order to separate said bundle substantially into individual fibers, c) impregnating the individual fibers with a thermoplastic polymer powder, and d) recompacting the fiber bundle and providing a flexible sheltering sheath around the bundle, said bundle being made from a thermoplastic powder, by causing the fiber bundle to coaxially run through a tubular die having a cross-section of rhomboidal shape with mean diagonals equal to $d_1$ and $d_2$ wherein $d_1/d_2$ is less than 1.

2. The filament according to claim 1, having a fiber content of up to about 70% by volume.

3. The filament according to claim 2, which has a fiber content of from about 40 to 60% by volume.

4. The filament according to claim 1, wherein the average diameter of the particles of the powder which impregnates the fibers is within a range of from about 10–100 μm.

5. The filament according to claim 1, wherein the sheath is applied to the impregnated fiber bundle by coaxial extrusion through a tubular die the cross-section of which has a geometrical shape of a rhombus with mean diagonals of about equal to $d_1$ and $d_2$.

6. The filament according to claim 1, having a substantially elliptical cross-section with a value of $d_1/d_2$ of from about 0.1–0.5.

7. The filament according to claim 1, wherein said fiberglass fibers have a count of from about 150 to 2,500 tex.

8. The filament according to claim 1, wherein said aramid fibers have a count of from about 1,000 to 2,000 decitex.

9. The filament according to claim 1, wherein said carbon fibers have a count of from $3\times10^3$ to $12\times10^3$ filaments.

10. The filament according to claim 1, wherein in said process for producing the same, the loosening of the fiber bundle is effected by means of a mechanical system with vibrating or pneumatic rollers.

11. The filament according to claim 1, wherein in said process for producing the same, the impregnation of the fiber bundle is carried out by causing the loosened fiber bundle to run through the powder kept under fluidized conditions inside a sealed chamber.

12. The filament according to claim 1, wherein the impregnation of the fiber bundle is carried out by dipping and pulling the loosened fiber bundle through a stationary bed constituted by a thermoplastic plastic polymer powder contained inside a tank submitted to continuous vibration.

13. The filament according to claim 2, wherein the flexible sheath which coats the fiber bundle and the impregnated thermoplastic powder are used in a weight ratio of the impregnated thermoplastic powder to the flexible sheath of from about 1:2 to 2:1.

* * * * *